United States Patent [19]
Parker et al.

[11] Patent Number: 5,837,408
[45] Date of Patent: Nov. 17, 1998

[54] XEROCOLOGRAPHY TANDEM ARCHITECTURES FOR HIGH SPEED COLOR PRINTING

[75] Inventors: Delmer G. Parker, Rochester, N.Y.; Gregory J. Kovacs, Ontario, Canada

[73] Assignee: Xerox Corporation, Stamford, Conn.

[21] Appl. No.: 915,403

[22] Filed: Aug. 20, 1997

[51] Int. Cl.⁶ .................................................. G03G 13/01
[52] U.S. Cl. .......................... 430/42; 430/44; 399/179; 399/232
[58] Field of Search ....................... 430/42, 44; 399/179, 399/232

[56] References Cited

U.S. PATENT DOCUMENTS

| | | | |
|---|---|---|---|
| 4,731,634 | 3/1988 | Stark | 399/232 |
| 4,868,611 | 9/1989 | Germain | 399/232 |
| 5,049,949 | 9/1991 | Parker et al. | 399/232 |
| 5,155,541 | 10/1992 | Loce et al. | 399/232 |
| 5,221,954 | 6/1993 | Harris | 399/232 |
| 5,223,906 | 6/1993 | Harris | 399/232 |
| 5,337,136 | 8/1994 | Knapp et al. | 399/299 |
| 5,347,303 | 9/1994 | Kovacs et al. | 347/118 |
| 5,373,313 | 12/1994 | Kovacs | 347/119 |
| 5,444,463 | 8/1995 | Kovacs et al. | 347/118 |
| 5,534,990 | 7/1996 | Harris | 399/232 |
| 5,565,974 | 10/1996 | Harris | 399/226 |
| 5,592,281 | 1/1997 | Parker et al. | 394/156 |

*Primary Examiner*—Roland Martin

[57] ABSTRACT

Full process color imaging is provided with the use of two xerocolography engines in tandem. Each of the two xerocolography engines is capable of creating three perfectly registered latent images with subsequent development thereof in a spot next to spot manner. Each engine is provided with three developer housing structures containing five different color toners including the three subtractive primary colors of yellow, cyan and magenta. Two of the primary colors plus black are used with one of the engines. The third primary color is used with the second tandem engine which also uses one of the primary colors used with the first engine as well as a fifth color which may be a logo or a gamut extending color. The full process color imaging capability provided is effected without any constraints regarding the capability of the laser imaging device to image through previously developed components of a composite image. Also, the development and cleaning field impracticalities imposed by quad and higher level imaging of the prior art are avoided. Moreover, the number of required image registrations compared to conventional tandem color imaging is minimal. Therefore, only one registration is required compared to three or four by conventional tandem engine imaging systems.

20 Claims, 6 Drawing Sheets

XEROCOLOGRAPHY TANDEM ARCHITECTURES FOR HIGH SPEED COLOR PRINTING

BACKGROUND OF THE INVENTION

This invention relates to a full color, dot next to dot, xerographic printing systems using a Raster Output Scanning (ROS) system incorporating a two wavelength (λ) laser diode source for the ROS and a charge retentive member in the form of a belt or drum structure which is responsive to the two wavelengths and, more particularly, to two 2-wavelength engines in tandem for high speed color printing.

Xerocolography (dry color printing) is a color printing architecture which combines multi-color xerographic development with multiwavelength laser diode light sources, with a one polygon, single optics ROS and with a polychromatic, multilayered photoreceptor to provide color printing in either a single pass or in two passes. Inherently perfect registration is achieved since the various color images are all written at the same imaging station with the same ROS. In all three latent images are written in this manner. Two of the three images are immediately developable because their voltage levels are offset from a background level while the voltage level of the third image is at the time of its formation equal to the background voltage level. Before the third image can be developed, the photoreceptor must be exposed to flood illumination of a predetermined wavelength.

Xerocolography is capable of producing either highlight color or process color images in a single pass as well as in multiple passes. In creating full process color images, using Image-On-Image (IOI) technology, toner particles are deposited on already developed toner images. With this type of imaging, it is desirable to use Non-interactive Development (NID) in order to avoid scavenging of an already developed image.

In the basic case of a two wavelength, non-tandem xerocolography system, perfectly registered K+2 (black+2 colors) colors or three colors are possible in a single pass. Since only three colors are possible in a single pass with the two wavelength system, the ability to print process color CMYK (cyan, magenta, yellow, black) requires a second pass. Therefore, in the two wavelength system, full process color output can only be produced at half the speed of a K+2 or 3 color xerocolographic imaging apparatus. This could be done in a single pass, but would require a very long belt and it would be necessary to image through already deposited toner layers.

Full gamut color imaging in a single pass is possible using four or more voltage level images but these systems suffer from the need to form latent images by exposing through already developed images. As evidenced by the success of the commercially available 4850™ and 4890™ highlight color machines which use tri-level imaging, the development fields which are half those of conventional xerography are practical. However, four or more voltage level images are difficult to develop because of the problems of dealing with large cleaning fields and small development fields.

In a conventional tandem architecture, four separate xerographic engines, each consisting of a ROS, a photoreceptor and a development system are used in series to develop and transfer the CMYK toners needed to produce process color images. If a special color is needed for a logo or to broaden the color gamut it must be added as a fifth xerographic engine with ROS, photoreceptor and development system.

Known tandem engine imaging apparatuses require as many as four separate image registrations. As will be appreciated, the more image registrations required the more there is a possibility for image misregistration resulting in unwanted color overlapping and fringing.

The tandem xerocolography architecture to be described is capable of producing a process color images with only two xerocolography modules as opposed to the four xerographic modules required for a conventional tandem xerography architecture. In addition to the required CMYK colors, a fifth color can be added to one of the xerocolography modules without any throughput penalty.

Following is a discussion of prior art, incorporated herein by reference, which may bear on the patentability of the present invention. In addition to possibly having some relevance to the question of patentability, these references, together with the detailed description to follow, are intended to provide a better understanding and appreciation of the present invention.

U.S. Pat. No. 4,731,634 entitled "Apparatus For Printing Black And Plural Highlight Color Images In A Single Pass" granted to Howard M. Stark on Mar. 15, 1988 discloses a method and apparatus for rendering latent electrostatic images visible using multiple colors of dry toner or developer and more particularly to printing toner images in black and at least two highlighting colors in a single pass of the imaging surface through the processing areas of the printing apparatus. Two of the toners are attracted to only one charge level on a charge retentive member to thereby providing black and one highlight color while two toners are attracted to another charge level to form the second highlight color.

U.S. Pat. No. 4,868,611 entitled "Tri-Level Xerography Scorotron Neutralization Concept" granted to Richard P. Germain on Sep. 19, 1989 discloses the use of a scorotron after the development of a first image. The scorotron serves to bring that first image to complete charge neutralization which removes the voltage responsible for the fringe fields thereby precluding fringe field development during the development of a subsequent image.

U.S. Pat. No. 5,049,949 entitled "Extension Of Tri-Level Xerography To Black Plus 2 Colors" granted to Parker et al on Sep. 17, 1991 discloses a highlight color printing apparatus and method for forming one black and two color images. A tri-level image containing CAD (charged area development) and DAD (discharged area development) image areas and a background area is formed. A second DAD image is formed by discharging the background area forming part of the tri-level image.

U.S. Pat. No. 5,155,541 entitled "Single Pass Digital Printer With Black, White And 2-Color Capability" granted to Robert P. Loce et al on Oct. 13, 1992 discloses a method and apparatus for printing toner images in black and at least two highlighting colors in a single pass of the imaging surface through the processing areas of the printing apparatus. Imaging and development techniques of color photography and tri-level xerography are combined to produce images with black and two colors wherein the two highlighting colors are developed with only one color toner. A single imaging step forms a four level charge pattern on a charge retentive member followed by development of two of the image levels using tri-level imaging techniques. Uniform exposure of the imaging surface, similar to that used to color photography techniques precedes development of the last image. The uniform exposure modifies the last developed image level and the background charge level allowing development of the last image with a single toner.

U.S. Pat. No. 5,221,954 entitled "Single Pass Full Color Printing System Using A Quad-Level Xerographic Unit" granted to Ellis D. Harris on Jun. 22, 1993 discloses a four color toner single pass color printing system consisting generally of a raster output scanner (ROS) optical system and a quad-level xerographic unit and a tri-level xerographic unit in tandem. The resulting color printing system would be able to produce pixels of black and white and all six primary colors. The color printing system uses a black toner and toners of the three subtractive primary colors or just toners of the three subtractive primary colors.

U.S. Pat. No. 5,223,906 entitled "Four Color Toner Single Pass Color Printing System Using Two Tri-Level Xerographic Units" granted to Ellis D. Harris on Jun. 29, 1993 discloses a four color toner single pass color printing system consisting generally of a raster output scanner (ROS) optical system and two tri-level xerographic units in tandem. Only two of the three subtractive primary colors of cyan, magenta and yellow are available for toner dot upon toner dot to combine to produce the additive primary colors. The resulting color printing system would be able to produce pixels of black and white and five of the six primary colors, with pixel next to pixel printing producing all but the strongest saturation of the sixth primary color, an additive primary color. The color printing system uses either four color toners or a black toner and three color toners.

U.S. Pat. No. 5,534,990 entitled "Full Color Printing System Using A Penta-Level Xerographic Unit" granted on Jul. 9, 1996 to Ellis D. Harris discloses a single pass full color printing system consisting generally of a raster output scanner (ROS) optical system and a quad-level xerographic unit and a penta-level xerographic unit in tandem. This full color printing system produces pixels of black and white and all six primary colors without toner upon toner.

U.S. Pat. No. 5,337,136 entitled "Tandem Tri-level Process Color Printer" granted to John F. Knapp et al on Aug. 9, 1994 discloses a tandem tri-level architecture. Three tri-level engines are arranged in a tandem configuration. Each engine uses one of the three primary colors plus one other color. Spot by spot, two color tri-level images can be created by each of the engines. The spot by spot images are transferred to an intermediate belt member, either in a spot on spot manner for forming full color images or in a spot next to spot manner to form highlight and/or logo color images. The images created by the tri-level engines can also be transferred to the intermediate in a manner such that both spot next to spot and spot on spot transfer is effected.

U.S. Pat. No. 5,347,303 entitled "Full Color Xerographic Printing System With Dual Wavelength, Single Optical System ROS And Dual Layer Photoreceptor" granted on Sep. 13, 1994 to Kovacs et al discloses a full color xerographic printing system, either two pass or single pass, with a single polygon, single optical system Raster Output Scanning (ROS) system which has a dual wavelength laser diode source for the ROS which images the dual beams at a single station as closely spaced spots or at two stations as closely spaced spots on a dual layer photoreceptor with each photoreceptor layer sensitive to or accessible by only one of the two wavelengths.

U.S. Pat. No. 5,373,313 entitled "Color Xerographic Printing System With Multiple Wavelength, Single Optical System ROS And Multiple Layer Photoreceptor" granted to Gregory J. Kovacs on Dec. 13, 1994 discloses single pass color xerographic printing system with a single polygon, a single optical system Raster Output Scanning (ROS) system which has a multiple wavelength laser diode source for the ROS which images the multiple beams at a single station as closely spaced spots on a multiple layer photoreceptor with each photoreceptor layer sensitive to or accessible to only one of the multiple wavelengths.

U.S. Pat. No. 5,444,463 entitled "Color Xerographic Printing System With Dual Wavelength, Single Optical System ROS And Dual Layer Photoreceptor" granted to Kovacs et al on Aug. 22, 1995 discloses a single pass color xerographic printing system with a single polygon, single optical system Raster Output Scanning (ROS) system which has a dual wavelength laser diode source for the ROS which images the dual beams at a single station as closely spaced spots on a dual layer photoreceptor with each photoreceptor layer sensitive to or accessible by only one of the two wavelengths.

U.S. Pat. No. 5,565,974 entitled "Penta-Level Xerographic Unit" granted to Ellis D. Harris on Oct. 15, 1996 discloses a penta-level xerographic unit which produces five exposure levels on a photoreceptor. The five exposure levels select between a subtractive and an adjacent additive primary color in both the CAD and DAD operational regimes of a xerographic process. Exposure levels intermediate between the CAD and the DAD result in white. The selection of two possible colors in CAD, or two possible colors in DAD, or the selection of no toner yields a possibility of five colors. This penta-level xerographic unit can be used for a K+3 reduced color gamut printer, typically cyan, yellow and red plus black.

U.S. Pat. No. 5,592,281 entitled "Development Scheme For Three Color Highlight Color Trilevel Xerography" granted to Parker et al on Jan. 7, 1997 discloses the creation of multiple color images in a single pass utilizing a multi-layered photoreceptor structure having layers which are responsive to different wavelength lasers. A composite image including three images areas is formed with substantially perfect registration. A CAD and DAD image are developed using CMB (conductive magnetic brush) development and a second DAD image is developed using a non-interactive development system. Development of the second DAD image without developing halos around the CAD image is accomplished by uniformly recharging the photoreceptor to the background potential prior to development of the second DAD image.

BRIEF DESCRIPTION OF THE INVENTION

In accordance with the present invention, the advantages of perfect registration of xerocolography are combined with the high throughput speed of tandem engines.

By using two xerocolography engines in tandem, a full process color imaging apparatus is provided. Each of the two xerocolography engines comprises three developer housings. In a preferred embodiment of the invention, one engine comprises three development structures including black (K), and two of the three subtractive primary colors, CMY. The second engine also comprises three development structures including two of the subtractive primary colors, one of which is the same as one of the subtractive primary colors of the first engine.

In the basic case of a two wavelength, non-tandem system, perfectly registered K+2 colors or three colors are possible in a single pass. Since only three colors are possible in a single pass with the two wavelength system, the ability to print process color CMYK requires a second pass. Therefore, in the two wavelength system, full process color output can only be produced at half the speed of a K+2 or 3 color imaging apparatus such as a xerocolographic imaging system.

In addition to the required CMYK colors, a fifth color can be added to one of the xerocolography modules without any throughput penalty. This is done to enable the printing of special logo colors or to broaden the color gamut or to print a second black.

The full process color imaging capability provided by this invention is effected without any constraints regarding the ability of the laser to image through previously developed components of a composite image. Also, the development and cleaning field impracticalities imposed by quad and higher level imaging of the prior art are avoided.

The number of required image registrations compared to conventional tandem color imaging is minimal. Therefore, only one registration is required compared to three or four by conventional tandem engine imaging systems.

DETAILED DESCRIPTION OF THE PREFERRED EMBODIMENT(S) OF THE INVENTION

Figure 4:
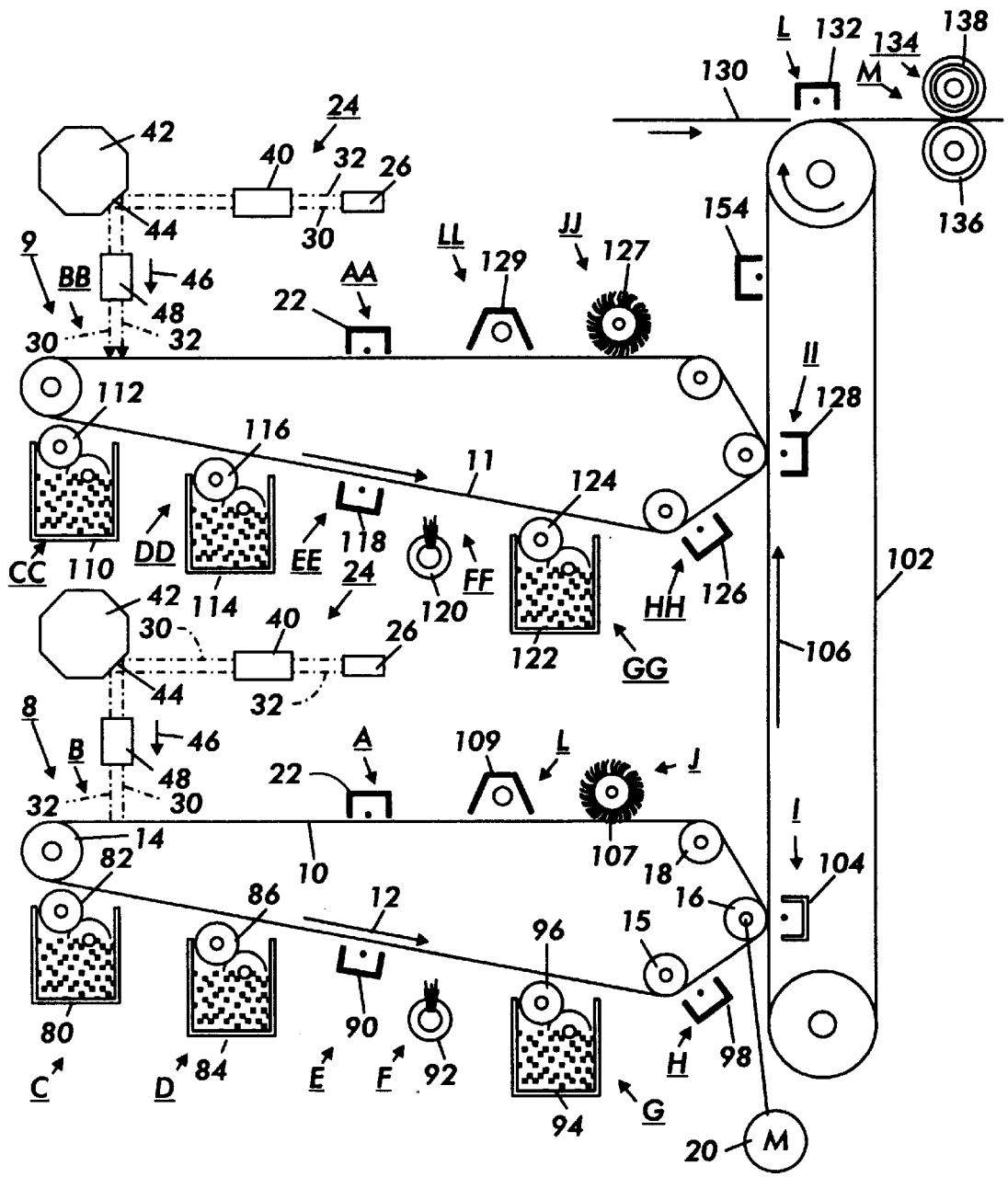
FIG. 4 is a schematic illustration of a system architecture for a tandem xerocolography imaging apparatus.

As shown in FIG. 4, two tandem xerocolography engines 8 and 9 comprising a charge retentive member in the form of a photoconductive belt structure 10 or 11 each comprising a photoconductive surface and an electrically conductive substrate. The belt 10 is mounted for movement past a charging station A, a first exposure station B, a first development station C, a second development station D, a recharging station E, a second exposure station F, a third development station G, a pretransfer charging station H and a transfer station I.

In like manner, the belt 11 is mounted for movement past a charging station, AA a first exposure station BB, a first development station CC, a second development station DD, a recharging station EE, a second exposure station FF, a third development station GG, a pretransfer charging station HH, and a transfer station II.

Belt 10 moves in the direction of arrow 12 to advance successive portions thereof sequentially through various processing stations disposed about the path of movement thereof. Belt 10 is entrained about a plurality of rollers 14, 15, 16 and 18. The roller 16 may be used as a drive roller and the roller 14 may be used to provide suitable tensioning of the photoreceptor belt 10. Motor 20 rotates roller 16 to advance belt 10 in the direction of arrow 12. Roller 16 is coupled to motor 20 by suitable means such as a belt drive, not shown.

As can be seen by further reference to FIG. 4, initially successive portions of belt 10 pass through charging station A. At charging station A, a corona discharge device such as a scorotron, corotron or dicorotron indicated generally by the reference numeral 22, charges the belt 10 to a selectively high uniform positive or negative potential, $V_0$. Any suitable control, well known in the art, may be employed for controlling the corona discharge device 22.

Next, the uniformly charged portions of the photoreceptor surface are advanced through exposure station B. At exposure station B, the uniformly charged photoreceptor or charge retentive member 10 is exposed to a laser based output scanning device 24 which effects selective discharge of the photoreceptor belt structure 10.

By further reference to FIG. 4, it can be seen that the raster output scanner 24 can use a dual wavelength hybrid or monolithically integrated laser semiconductor structure 26 consisting of a red, e.g. 670 nm, wavelength laser emitter such as a semiconductor structure of AlGaInP/GaAs and an infrared, e.g. 830 nm, laser emitter such as a semiconductor structure of AlGaAs/GaAs, both laser emitter structures being known to those of ordinary skill in the art. The structure 26 emits two different wavelength beams 30 and 32.

The different wavelength beams 30 and 32 must be scanned sequentially over top of each other on the photoreceptor to yield excellent registration. The tangential offset of the laser sources is given an upper limit of 300 $\mu$m since tangential offset does not introduce scan line bow. The effect of tangential offset is to require delay in the electronic modulation signals to one of the dual beams relative to the other since one beam lags the other during scanning across the photoreceptor. Sagittal offset can also be used so that the beams are simultaneously scanning adjacent lines. On each successive scan the line previously scanned by the forward beam is overscanned by the trailing beam. Appropriate image processing algorithms produce the desired image. The dual wavelength laser structure provides a substantially common spatial origin for each beam. Each beam is independently modulated so that it exposes the photoreceptor structure in accordance with a respective color image.

The two laser beams 30 and 32 emitted from the laser structure 26 are input to a conventional beam input optical system 40 which collimates, conditions and focuses the beams onto optical paths such that they impinge on a rotating polygon mirror 42 having a plurality of facets 44. As the polygon mirror rotates, the facets cause the reflected beams to deflect repeatedly in the direction indicated by the arrow 46. The deflected laser beams are input to a single set of imaging and correction optics 48, which corrects for errors such as polygon angle error and wobble and focuses the beams onto the photoreceptor belt structure 10.

Figure 1:
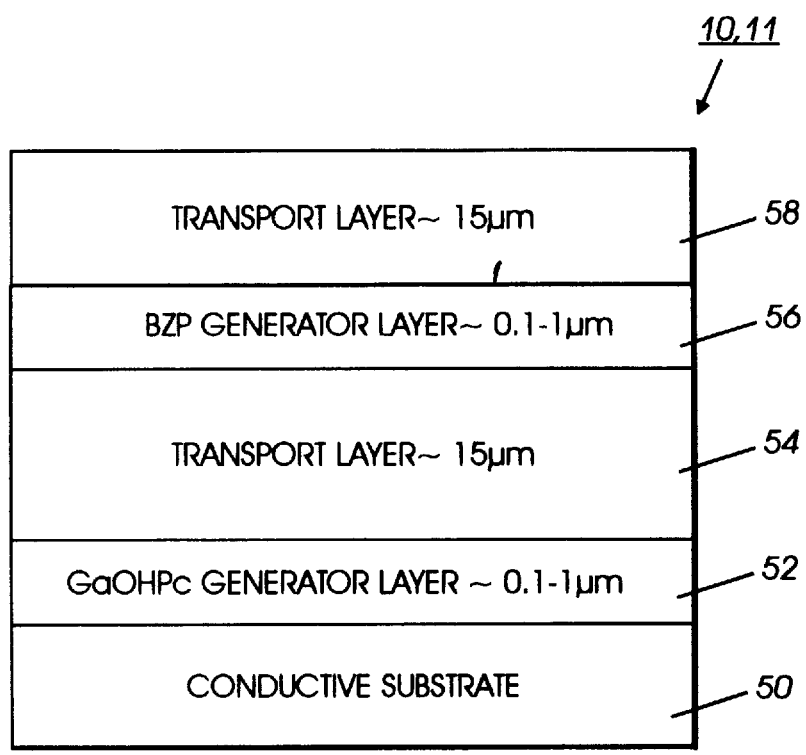
FIG. 1 is a schematic illustration of a dual layer photoreceptor belt for use in the xerographic printing systems of FIGS. 4–6.

As illustrated in FIG. 1 the photoreceptor belts 10 and 11 each consist of a flexible electrically conductive substrate 50. The substrate can be opaque, translucent, semitransparent, or transparent, and can be of any suitable conductive material, including copper, brass, nickel, zinc, chromium, stainless steel, conductive plastics and rubbers, aluminum, semitransparent aluminum, steel, cadmium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. In addition, the substrate can comprise an insulative layer with a conductive coating, such as vacuum-deposited metallization on plastic, such as titanized or aluminized Mylar™ polyester, wherein the metalized surface is in contact with the bottom photoreceptor layer or any other layer such as a charge injection blocking or adhesive layer situated between the substrate and the bottom photoreceptor layer. The substrate has any effective thickness, typically from about 6 to about 250 microns, and preferably from about 50 to about 200 microns, although the thickness can be outside of this range. The photoreceptor belt comprises a pair of photoreceptor structures each including a charge generation layer and a charge transport layer.

Adhered to the substrate 50 is a GaOHPc first or lower generator layer 52 approximately 0.1 to 1 $\mu$m thick, a first or lower transport layer 54 of N,N'-diphenyl-N,N'-bis(3"-methylphenyl)-(1,1'-biphenyl)-4,4'-diamine (TPD) in polycarbonate which is hole transporting and approximately 15 $\mu$m thick, a benzimidazole perylene (BZP) second or upper generator layer 56 approximately 0.1 to 1 $\mu$m thick, a second or upper transport layer 58 of TPD in polycarbonate which is hole transporting and approximately 15 $\mu$m thick.

The GaOHPc generator layer is thin enough to maintain low dark decay and the BZP generator layer is thick enough to be opaque to the wavelength used to discharge it. BZP is known to be coatable to opaque thicknesses while maintaining low dark decay.

For this illustrative example, the GaOHPc generator layer is infrared sensitive at 830 nm and the BZP generator layer is red sensitive at 670 nm. Each generator layer can only be accessed by one of the two wavelengths. THE BZP layer does not absorb the 830 nm wavelength and passes it to the GaOHPc layer. The 670 nm wavelength is absorbed by the BZP layer and is not transmitted to the GaOHPc layer (which would also be sensitive to the 670 nm light).

The generator and transport layers can be deposited by vacuum evaporation or solvent coating upon the substrate by means known to those of ordinary skill in the art.

Figure 2:
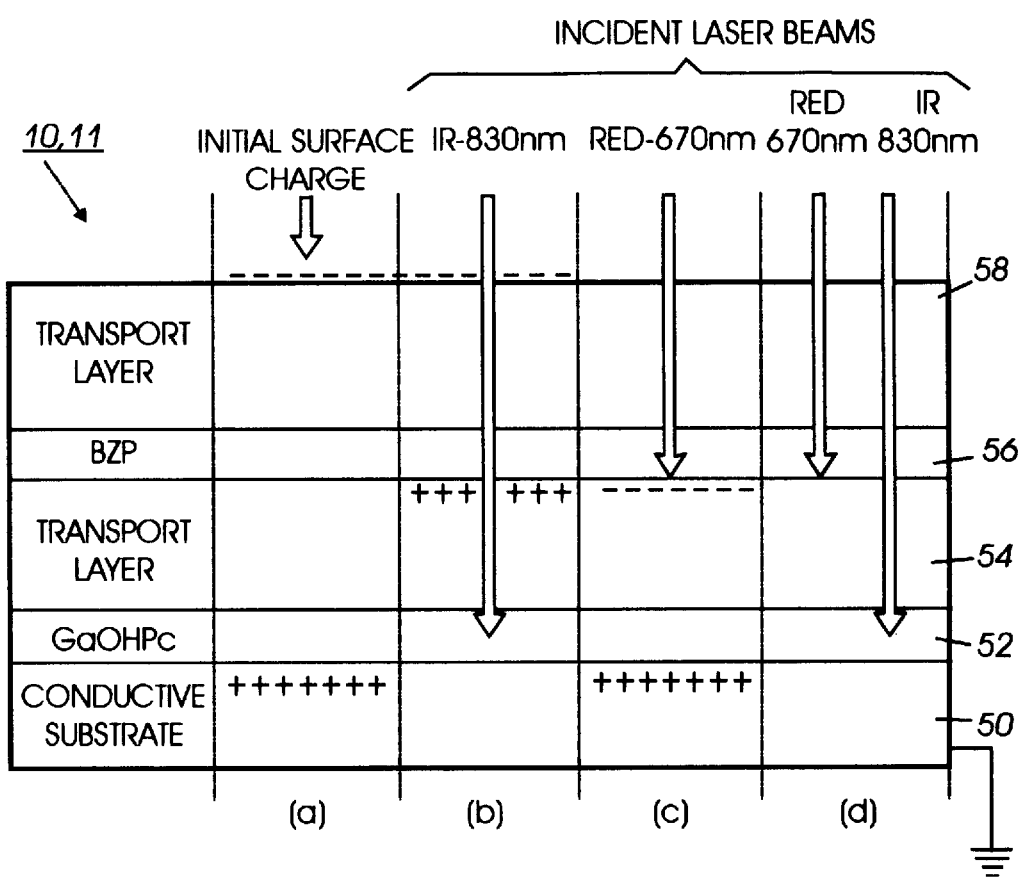
FIG. 2 is a schematic illustration of the state of the photoreceptor following initial exposure thereof.

During exposure of the photoreceptor belts 10,11 to the light beams from the ROS as shown in FIG. 2, the 670 nm wavelength of one modulated beam would be entirely absorbed in the opaque BZP generator layer. Exposure with the 670 nm beam would therefore discharge the BZP generating layer 56 and upper transport layer 58. None of the 670 nm light beam would reach the GaOHPc layer so that it and the lower transport layer 54 would remain fully charged. The second wavelength is chosen to be 830 nm to insure that it will pass completely through the BZP layer without effecting any discharge of that layer or upper transport layer 58. However, the GaOHPc layer is sensitive to 830 nm and exposure with this wavelength from a modulated beam will discharge that layer and the lower transport layer 54. The 830 nm exposure should not be allowed to effect discharge through the benzimidazole perylene layer and the upper transport layer.

As illustrated in FIG. 2, exposure of an area of the photoreceptor belts 10 and 11 to the both wavelengths or to only one of the wavelengths results in the photoreceptor being electrostatically conditioned as follows: (a) the unexposed areas which retain the original surface voltage, (b) areas exposed with the 830 nm beam which are discharged to roughly one-half of the original photoreceptor surface voltage, (c) areas exposed with the 670 nm beam which are also discharged to roughly one-half of the original photoreceptor voltage, $V_O$ and (d) the areas exposed with both the 830 nm and 670 nm wavelength beams which are fully discharged, that is, to the residual photoreceptor voltage. While only three voltage levels are present on the photoreceptor immediately following exposure, there will be four distinctly different areas after xerographic development during the first pass of the photoreceptor through the process stations. While the surface voltages in regions (b) and (c) are roughly equal after exposure they have been formed in very distinct ways. During the development process the photoreceptor will remember how these voltages were formed to allow development in very different ways in the two regions.

Figure 3:
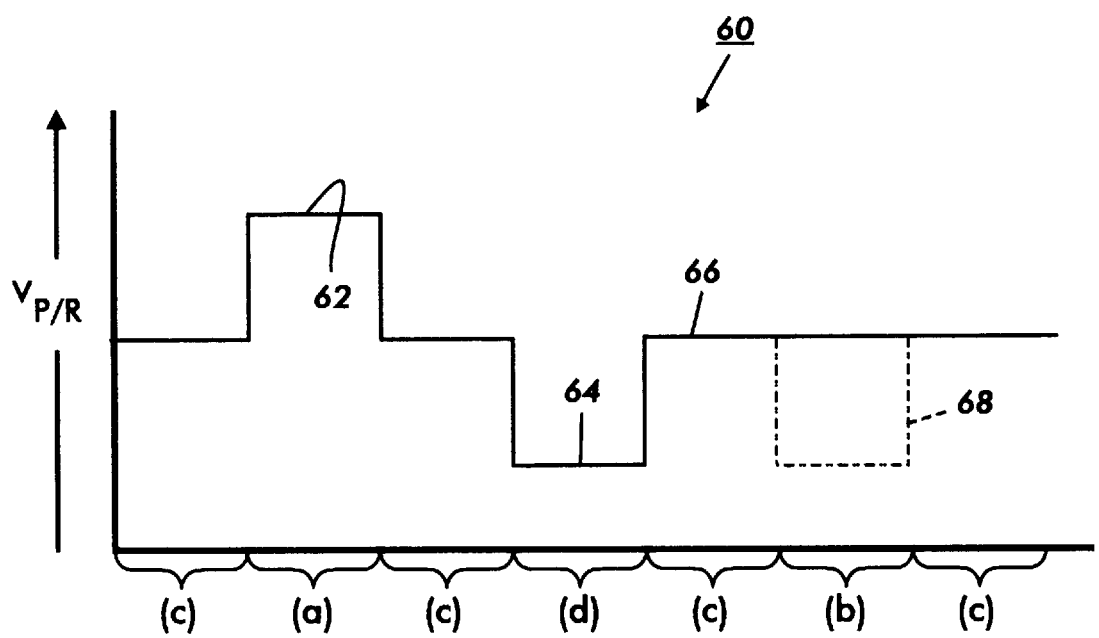
FIG. 3 is a tri-level image profile.

The image area represented by (a) corresponds to the CAD portion of a tri-level image while the image area represented by (d) corresponds to the DAD portion of a tri-level image. The areas represented by (b) and (c) in FIG. 3 are at a voltage level corresponding to the background level of the tri-level image. Because of the way these images were formed the area (b) represents a second DAD image area which initially is not distinguishable from the background voltage level at (c). At the appropriate point in the imaging process, the second DAD image is rendered distinguishable so that it can be developed.

As shown in FIG. 3, the condition of the photoreceptor 10 after exposure is such that it contains a tri-level image 60 comprising a charged image area 62, a discharged image area 64 and a background area 66. The tri-level image also includes an initially virtual image 68 which is initially at the same voltage level as the background voltage. The vertical axis represents photoreceptor voltage while the horizontal axis represents the positioning of the images thereon.

As illustrated in FIG. 4, as the photoreceptor belt moves past a black (K) developer housing structure 80 the CAD image 62 is developed with black imaging material such as toner deposited thereon via a donor roll structure 82. While the developer housing structure is illustrated as being a Non Interactive Development (NID) device a magnetic brush development system may also be employed since the CAD image is the first image developed.

As the tri-level image is moved past a yellow (Y) developer housing structure 84 yellow imaging material such as toner is deposited on the DAD image area 64 via an electroded donor roll structure 86. This development station could also employ a soft magnetic brush development system.

The order of the CAD and first DAD development can be reversed since there are no intervening steps in the process.

Following development of the CAD and DAD images, the photoreceptor is uniformly recharged to the background level 66 using a corona discharge device 90 such as a scorotron or dicorotron. The recharge step is followed by flood exposing the entire photoreceptor 10 using an illumination source 92 operating at a suitable wavelength. The effect of this exposure step is to discharge regions of the photoreceptor containing the virtual image 68 thereby forming a second developable DAD image.

The toners used to develop the CAD and first DAD images are opaque to light at the wavelength of the flood exposure in order to avoid developing a voltage offset after the recharge and flood exposure.

The second developable DAD image is developed with magenta (m) toner using an NID device 94 including an electroded donor roll 96.

Because the composite image developed on the photoreceptor consists of both positive and negative imaging material such as toner, a typically positive pretransfer corona discharge member 98 disposed at pretransfer charging station H is provided to condition the toner for effective transfer to a substrate using positive corona discharge. The pretransfer corona discharge member is preferably an AC corona device biased with a DC voltage to operate in a field sensitive mode and to perform tri-level xerography pretransfer charging in a way that selectively adds more charge (or at least comparable charge) to the part of composite tri-level image that must have its polarity reversed compared to elsewhere. This charge discrimination can be enhanced by discharging the photoreceptor carrying the composite developed latent image with light (not shown and usually done through the back of the photoreceptor belt) before the pretransfer charging begins. Furthermore, flooding the photoreceptor with light coincident with the pretransfer charging minimizes the tendency to overcharge portions of the image which are already at the correct polarity.

The K, Y and M images are transferred to an Intermediate Transfer Belt (ITB) 102 which is supported in intimate contact with the photoreceptor for synchronous movement therewith, such transfer taking place at transfer station I.

Transfer station I includes a corona generating device 104 which sprays ions of a suitable polarity onto the backside of belt 102. This attracts the charged toner powder images from the photoreceptor belt 10 to the ITB 102. After transfer, the ITB continues to move, in the direction of arrow 106. Transfer can also be accomplished with a biased transfer roll in place of the corona generating device.

After the images have been transferred to the ITB from photoconductive surface of belt 10, the residual toner particles carried by the photoconductive surface are removed therefrom. These particles are removed at cleaning station J. A magnetic brush cleaner housing is disposed at the cleaner station J. The cleaner apparatus comprises a conventional magnetic brush roll structure 107 for causing carrier particles in the cleaner housing to form a brush-like orientation relative to the roll structure and the charge retentive member. It also includes a pair of detoning rolls (not shown) for removing the residual toner from the brush. Other cleaning systems, such as fur brush or blade, are also suitable.

Subsequent to cleaning, a discharge lamp 109 positioned at station L floods the photoconductive surface with light to dissipate any residual electrostatic charge remaining prior to the charging thereof for the successive imaging cycle.

The condition of the photoreceptor 11 of engine 9 after exposure is such that it contains a tri-level image which is exactly the same as image 60 comprising a charged image area, a discharged image area and a background area. The tri-level image also includes an initially virtual image which is at the same voltage level as the background voltage.

As further illustrated in FIG. 4, as the photoreceptor 11 belt moves past an orange (O) developer housing structure 110, the CAD image is developed with orange toner deposited thereon via a donor roll structure 112. While the developer housing structure is illustrated as being a Non Interactive Development (NID) device a magnetic brush development system may also be employed since the CAD image is the first image developed.

As the tri-level image is moved past a cyan (C) developer housing structure 114 cyan toner is deposited on the DAD image area via an electroded donor roll structure 116. A soft magnetic brush could also be used here.

The order of the CAD and first DAD development can be reversed since there are no intervening steps in the process.

Following development of the CAD and DAD images, the photoreceptor 11 is uniformly recharged to the background level of the original tri-level image using a corona discharge device 118 such as a scorotron or dicorotron. The recharge step is followed by flood exposing the photoreceptor using an illumination source 120 operating at a suitable wavelength. The effect of this exposure step is to discharge regions of the photoreceptor containing the virtual image thereby forming a second developable DAD image.

The toners used to develop the CAD and first DAD images are opaque to light at the wavelength of the flood exposure in order to avoid developing a voltage offset after the recharge and flood exposure.

The second developable DAD image on the photoreceptor 11 is developed with magenta (M) toner using an NID device 122 including an electroded donor roll 124.

Because the composite image developed on the photoreceptor consists of both positive and negative toner, a typically positive pretransfer corona discharge member 126 disposed at pretransfer charging station HH is provided to condition the toner for effective transfer to a substrate using positive corona discharge. The pretransfer corona discharge member is preferably an AC corona device biased with a DC voltage to operate in a field sensitive mode and to perform tri-level xerography pretransfer charging in a way that selectively adds more charge (or at least comparable charge) to the part of composite tri-level image that must have its polarity reversed compared to elsewhere. This charge discrimination can be enhanced by discharging the photoreceptor carrying the composite developed latent image with light (not shown and usually done through the back of the photoreceptor belt) before the pretransfer charging begins. Furthermore, flooding the photoreceptor with light coincident with the pretransfer charging minimizes the tendency to overcharge portions of the image which are already at the correct polarity.

The O, C and M images are transferred to the Intermediate Transfer Belt (ITB) 102 which is movement therewith, such transfer taking place at transfer station II.

The colors which can be built up on the transfer belt 102 are as follows: K, C, M, Y, YC(=G), YM(=R), MC(=B) and W (G=green, R=red, B=blue and W=white) which are all of the color combinations needed for normal process color. In addition the following combinations are possible from the O color: O, OY and OM. As noted herein above, the color O could be also be a special logo color.

The color O (orange) has been used as an example of a gamut broadening color or special logo color or custom color. However this development could be replaced by a second black toner which could be used to enhance the density of the black image from the first engine 8 for special effects.

Transfer station II includes a corona generating device 128 which sprays ions of a suitable polarity onto the backside of belt 102. This attracts the charged toner powder images from the photoreceptor belt 11 to the ITB 102. After transfer, the ITB continues to move, in the direction of arrow 106. Transfer can also be accomplished with a biased transfer roll in place of the corona generating device.

After the ITB is separated from photoconductive surface of belt 11, the residual toner particles carried by the photoconductive surface are removed therefrom. These particles are removed at cleaning station JJ. A magnetic brush cleaner is disposed at the cleaner station JJ. The cleaner may comprise a magnetic brush roll structure 127 for causing carrier particles in the cleaner housing to form a brush-like orientation relative to the roll structure and the charge retentive member. It may also include a pair of detoning rolls, not shown, for removing the residual toner from the brush. Other cleaning systems, such as fur brush or blade, are also suitable.

Subsequent to cleaning, a discharge lamp 129 positioned at station LL floods the photoconductive surface with light to dissipate any residual electrostatic charge remaining prior to the charging thereof for the successive imaging cycle.

The composite images created using the tandem engines 8 and 9 are transferred to a final substrate 130 such as plain paper at a transfer station L. A transfer corona discharge device 132 is provided for facilitating transfer. Transfer can also be accomplished with a biased transfer roll in place of the corona generating device.

Fusing station M includes a fuser assembly, indicated generally by the reference numeral 134, which permanently affixes the transferred powder image to substrate 130. Preferably, fuser assembly 134 comprises a heated fuser roller 136 and a pressure roller 138. Substrate 130 passes between fuser roller 136 and pressure roller 138 with the toner powder images contacting fuser roller 136. In this manner, the toner powder image is permanently affixed to substrate 130. After fusing, a chute, not shown, guides the advancing substrate 130 to a catch tray, also not shown, for subsequent removal from the printing machine by the operator.

Figure 5:
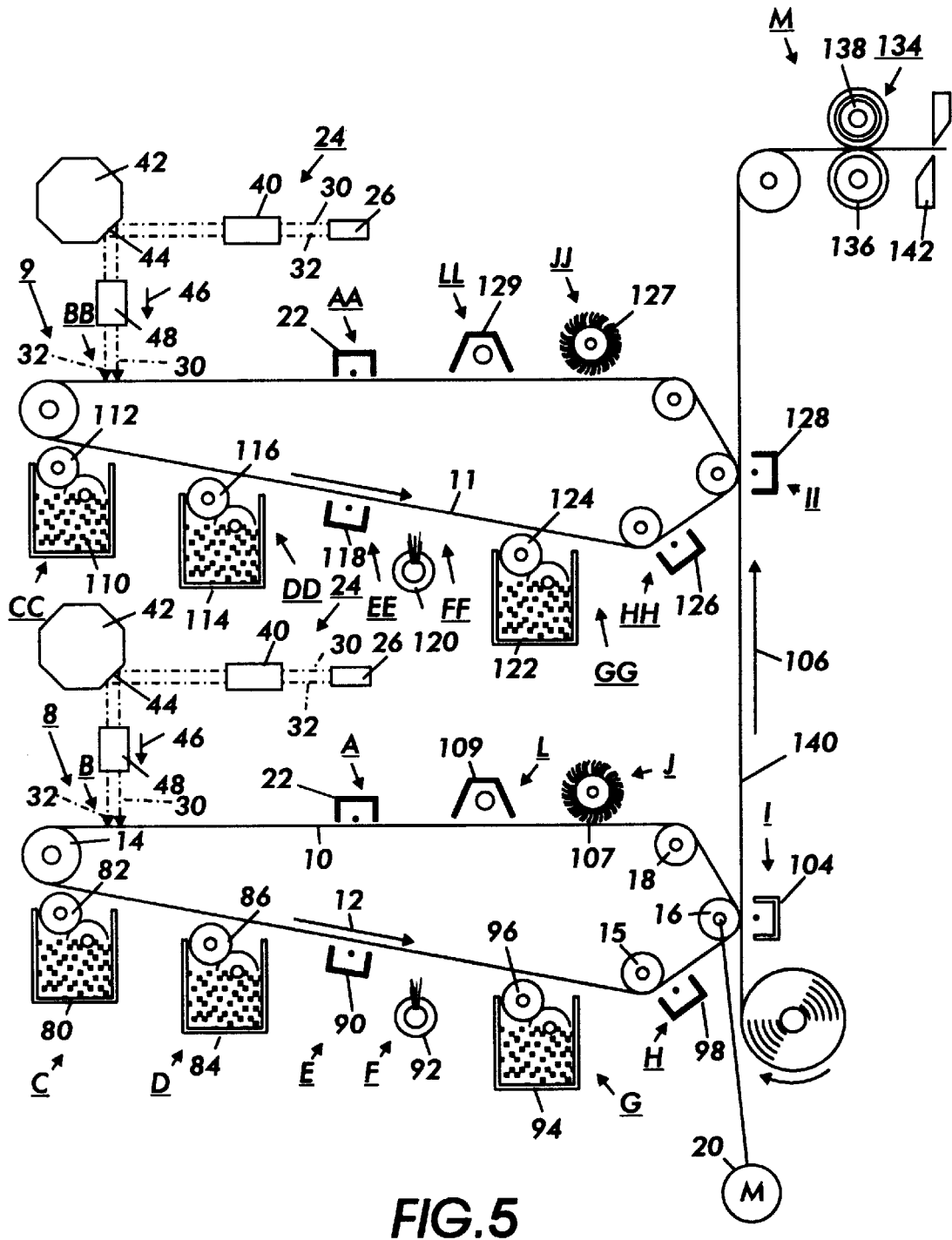
FIG. 5 is a schematic illustration of another embodiment of a system architecture for a tandem xerocolography.

As illustrated in FIG. 5 composite toner images created using the two tandem xerocolography engines can also be formed on a paper web 140 supported for movement past the two engines. After the images are fused to the web material, a cutter structure 142 serves to cut the web at an appropriate place. In place of a continuous paper web, cut sheet paper could also be used to receive the transferred toner images.

Figure 6:
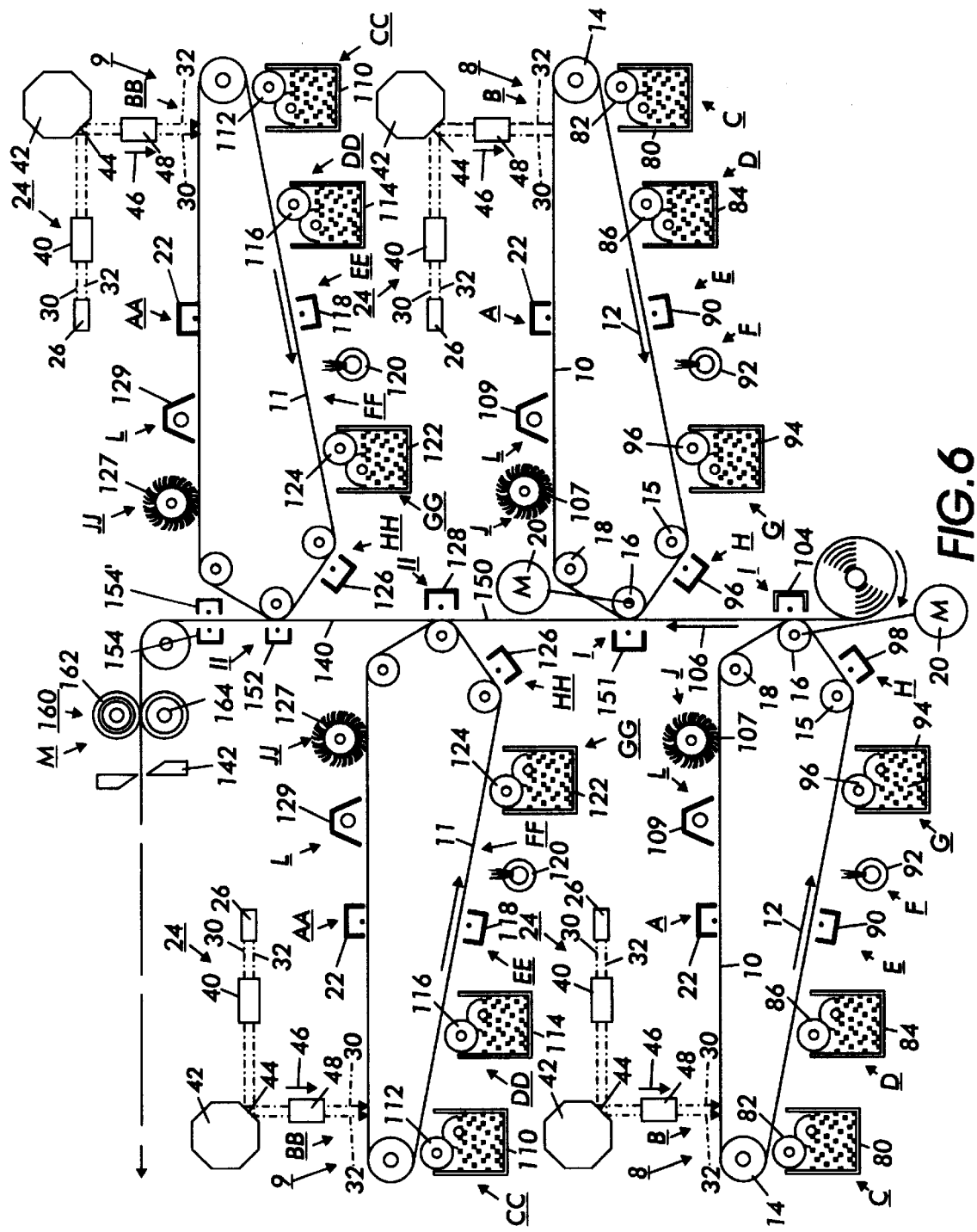
FIG. 6 is a schematic illustration of still another embodiment of a system architecture for a tandem xerocolography.

As illustrated in FIG. 6, the engines 8 and 9 are utilized with another pair of identical engines 8 and 9 to form duplex images on a web 150. To this end, the engines 8 and 9 are supported such that images created thereby are transferred to the backside of the web 150. A pair of transfer corona devices 151 and 152 are provided for effecting transfer of the images to the backside of the web 150. Transfer can also be accomplished with biased transfer rolls in place of the corona generating devices. A heat and pressure fuser apparatus comprises a pair of heated fuser rolls 162 and 164 for fusing the duplexed images on substrate 150. In place of a continuous paper web, cut sheet paper could also be used to receive the transferred toner images in duplex fashion.

We claim:

1. A method of creating process color images in a single pass using dot next to dot imaging devices in tandem, said method including the steps of:

uniformly charging a charge retentive structure of a first tandem imaging device to a predetermined voltage level;

using a single exposure device operating at two different wavelengths, creating trilevel latent electrostatic images comprising CAD and DAD images at two different voltage levels, background areas at a third voltage level and a virtual image at said background voltage level;

developing said CAD and DAD images of said first tandem engine with two different color inks;

conditioning said charge retentive member of said first tandem engine for converting said virtual image to a DAD image;

developing said image formed by said step of conditioning of said first tandem engine with an ink of a different color from said two different color inks;

transferring said developed images of said first tandem engine to an intermediate support member;

uniformly charging a charge retentive structure of a second tandem imaging device to a predetermined voltage level;

using a single exposure device operating at two different wavelengths, creating trilevel latent electrostatic images comprising CAD and DAD images at two different voltage levels, background areas at a third voltage level and a virtual image at said background voltage level;

developing said CAD and DAD images of said second tandem engine with two different color inks from said two different color inks;

conditioning said charge retentive member of said second tandem engine for converting said virtual image to a DAD image;

developing said image formed by said step of conditioning said charge retentive surface of said second tandem engine;

transferring said developed images of said second tandem engine to said intermediate support member to yield process color images with the images transferred from the first tandem engine;

at least one of said steps of developing images using said second tandem engine being effected using a color ink which is the same as one of the color inks used in developing images using said first tandem engine.

2. The method according to claim 1 wherein said steps of using single exposure devices is effected using trilevel imaging devices.

3. The method according to claim 2 wherein each of said steps of using trilevel imaging devices is used with a multilayered charge retentive member responsive to two wavelengths.

4. The method according to claim 3 wherein said multilayered charge retentive member is a photoreceptor belt.

5. The method according to claim 1 wherein said steps of conditioning are effected using a flood exposure device.

6. The method according to claim 5 wherein said steps of using single exposure devices is effected using trilevel imaging devices.

7. The method according to claim 6 wherein each of said steps of using trilevel imaging devices is used with a multilayered charge retentive member responsive to two wavelengths.

8. The method according to claim 7 wherein said multilayered charge retentive member is a photoreceptor belt.

9. The method according to claim 8 wherein said color inks comprise toner material.

10. A method of creating process color images in a single pass using dot next to dot imaging devices in tandem, said method including the steps of:

using a first tandem engine, forming three dot next to dot images on a charge retentive member, each of said images being of a different color;

transferring said images to a substrate;

using a second tandem engine, forming three dot next to dot images on a charge retentive member, each being a color different from each other and different from two of said images formed using said first tandem engine; and one of said three images formed with said second tandem engine being formed with an imaging material which is the same color as one imaging material used in one of said images formed with said first tandem engine and transferring said images formed with said second tandem engine to said to yield process color images with the images transferred from the first tandem engine.

11. The method according to claim 10 wherein said charge retentive member comprises a photoreceptor.

12. The method according to claim 11 wherein said steps of using single exposure devices is effected using trilevel imaging devices.

13. The method according to claim 12 wherein each of said steps of using trilevel imaging devices is used with a multilayered charge retentive member responsive to two wavelengths.

14. The method according to claim 13 wherein said multilayered charge retentive member is a photoreceptor belt or drum.

15. The method according to claim 14 wherein said second tandem engine utilizes two imaging materials which are a different color from each other and different from each of the imaging materials used with said first tandem engine.

16. The method according to claim 15 wherein said imaging materials comprise toner.

17. The method according to claim 15 wherein said single exposure device comprises a ROS operating at two different wavelengths.

18. The method according to claim 17 wherein said photoreceptor comprises a multilayered structure with a pair of charge generating/transport layers each of which is responsive to a different wavelength emitted from said ROS.

19. The method according to claim 18 wherein said steps of forming color images with said first and second tandem engines is effected forming trilevel images containing two immediately developable CAD and DAD images and a virtual image.

20. The method according to claim 19 wherein said photoreceptor is flood exposed using a light source of a predetermined wavelength subsequent to the development of a CAD and a DAD image.

* * * * *